(12) United States Patent
Adique et al.

(10) Patent No.: US 9,534,857 B2
(45) Date of Patent: Jan. 3, 2017

(54) LIQUID COOLING SYSTEM WITH THERMAL VALVE DEFLECTOR

(71) Applicant: PRATT & WHITNEY CANADA CORP., Longueuil (CA)

(72) Inventors: Marc Jordan Adique, Brampton (CA); Kevin Ng, Hamilton (CA); Daniel Alecu, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 579 days.

(21) Appl. No.: 13/772,677

(22) Filed: Feb. 21, 2013

(65) Prior Publication Data

US 2014/0231062 A1 Aug. 21, 2014

(51) Int. Cl.
| | | |
|---|---|---|
| G05D 23/02 | (2006.01) | |
| F28F 27/02 | (2006.01) | |
| F02C 7/14 | (2006.01) | |
| F01M 5/00 | (2006.01) | |

(52) U.S. Cl.
CPC ............. *F28F 27/02* (2013.01); *F02C 7/14* (2013.01); *F01M 5/007* (2013.01); *F28F 2250/06* (2013.01); *F28F 2265/02* (2013.01); *G05D 23/022* (2013.01)

(58) Field of Classification Search
CPC ....... F01M 5/007; F01P 7/16; F01P 2007/168; F02C 7/14; F28F 27/02; F28F 2250/06; G05D 23/02; G05D 23/021; G05D 23/022
USPC ......................................................... 236/34.5
See application file for complete search history.

(56) References Cited

U.S. PATENT DOCUMENTS

| | | | |
|---|---|---|---|
| 2,731,239 A | | 1/1956 | Andersen |
| 3,404,837 A | * | 10/1968 | James ................. F16H 57/0413 236/34.5 |
| 3,650,505 A | | 3/1972 | Drexel |
| 3,875,757 A | | 4/1975 | Amano |
| 4,164,332 A | | 8/1979 | Insch |
| 4,216,902 A | | 8/1980 | Braukmann |
| 5,727,729 A | * | 3/1998 | Hutchins ............ G05D 23/1333 123/41.1 |
| 6,962,295 B2 | * | 11/2005 | Ieda .................... F16H 57/0413 137/334 |
| 7,387,489 B2 | | 6/2008 | Appleby et al. |

(Continued)

FOREIGN PATENT DOCUMENTS

KR 10-0680538 2/2007

*Primary Examiner* — Jonathan Bradford
(74) *Attorney, Agent, or Firm* — Norton Rose Fulbright Canada LLP (57) ABSTRACT

The liquid cooling system has a heat exchanger having a fluid inlet and an outlet; a fluid supply conduit leading to the inlet of the heat exchanger; a fluid return conduit extending from the outlet of the heat exchanger; a bypass conduit extending between the fluid supply conduit and the fluid return conduit; a thermal valve configured for selectively closing the bypass conduit, the valve having a temperature sensing element positioned downstream of both the heat exchanger and the bypass conduit, the temperature sensing element configured to selectively move the thermal valve in response to a temperature change of the liquid which the temperature sensing element is exposed to relative to a temperature threshold of the valve; and a deflector positioned between the temperature sensing element and at least one of the bypass conduit and the heat exchanger outlet.

11 Claims, 5 Drawing Sheets

(56) References Cited

U.S. PATENT DOCUMENTS

| | | | | |
|---|---|---|---|---|
| 7,445,161 B2* | 11/2008 | Inoue | ............... | F01P 7/16 236/101 C |
| 7,661,877 B2 | 2/2010 | Kitahara | | |
| 2010/0012738 A1* | 1/2010 | Park | ............... | F01P 7/16 236/101 C |
| 2014/0231062 A1 | 8/2014 | Adique et al. | | |

* cited by examiner

LIQUID COOLING SYSTEM WITH THERMAL VALVE DEFLECTOR

TECHNICAL FIELD

The application relates generally to the field of gas turbine engines, and more particularly to gas turbine fluid systems.

BACKGROUND

It is known to use a thermally activated valve (referred to as a thermal valve herein) in association with a cooling system to selectively open or close a heat exchanger bypass conduit based on the temperature of the liquid. This known arrangement has been satisfactory to a certain degree. However, at least in some applications, such thermal valves were found to wear prematurely.

Accordingly, there remains room for improvement in addressing the wear of thermal valves used to control a heat exchanger bypass.

SUMMARY

In one aspect, there is provided a liquid cooling system for directing a fluid therethrough, the system comprising: a heat exchanger having a fluid inlet and outlet; a fluid supply fluid supply conduit communicating with the inlet of the heat exchanger; a fluid return conduit extending from the outlet of the heat exchanger; a bypass conduit extending between the fluid supply conduit and the fluid return conduit in parallel with the heat exchanger; a thermal valve configured for selectively closing the bypass conduit, the valve having a temperature sensing element positioned downstream of both the heat exchanger and the bypass conduit, the temperature sensing element configured to selectively move the thermal valve in response to a temperature change of the liquid which the temperature sensing element is exposed to relative to a temperature threshold of the valve; and a deflector positioned between the temperature sensing element and the heat exchanger outlet, the deflector being shaped and configured to impede directed impingement of cooled liquid flow exiting the heat exchanger outlet on the temperature sensing element during activation of the valve.

In a second aspect, there is provided a liquid cooling system for directing a fluid therethrough, the system comprising: a heat exchanger having a fluid inlet and outlet; a fluid supply conduit leading to the inlet of the heat exchanger; a fluid return conduit extending from the outlet of the heat exchanger; a bypass conduit extending between the fluid supply conduit and the fluid return conduit in parallel with the heat exchanger; a thermal valve configured for selectively closing the bypass conduit, the valve having a temperature sensing element positioned downstream of both the heat exchanger and the bypass conduit, the temperature sensing element configured to selectively move the thermal valve in response to a temperature change of the liquid which the temperature sensing element is exposed to relative to a temperature threshold of the valve a temperature sensing element the temperature sensing element; and a deflector positioned between the temperature sensing element and the bypass conduit, the deflector being shaped and configured to guide liquid flow exiting the bypass conduit to mix with liquid flow exiting the heat exchanger outlet upstream the thermal sensing element.

In a third aspect, there is provided a liquid cooling system for directing a fluid therethrough, the system comprising: a heat exchanger having a fluid inlet and outlet; a fluid supply conduit leading to an inlet of a heat exchanger; a fluid return conduit extending from an outlet of the heat exchanger; a bypass conduit extending between the fluid supply conduit and the fluid return conduit in parallel with the heat exchanger; a thermal valve configured for selectively closing the bypass conduit, the valve having a temperature sensing element positioned downstream of both the heat exchanger and the bypass conduit, the temperature sensing element configured to selectively move the thermal valve in response to a temperature change of the liquid which the temperature sensing element is exposed to relative to a temperature threshold of the valve a temperature sensing element the temperature sensing element; and a deflector positioned between the temperature sensing element and at least one of the bypass conduit and the heat exchanger outlet, the deflector being configured and adapted to impede direct impingement of unmixed heat exchanger outlet flow on the temperature sensing element during said activation.

Further details of these and other aspects of the present invention will be apparent from the detailed description and figures included below.

DESCRIPTION OF THE DRAWINGS

Reference is now made to the accompanying figures, in which.

DETAILED DESCRIPTION

It was found that the premature wear of the thermal valves was likely caused by excessive open/close cycling caused by temperatures oscillating in or around the threshold temperature range of the valve.

Figure 3:
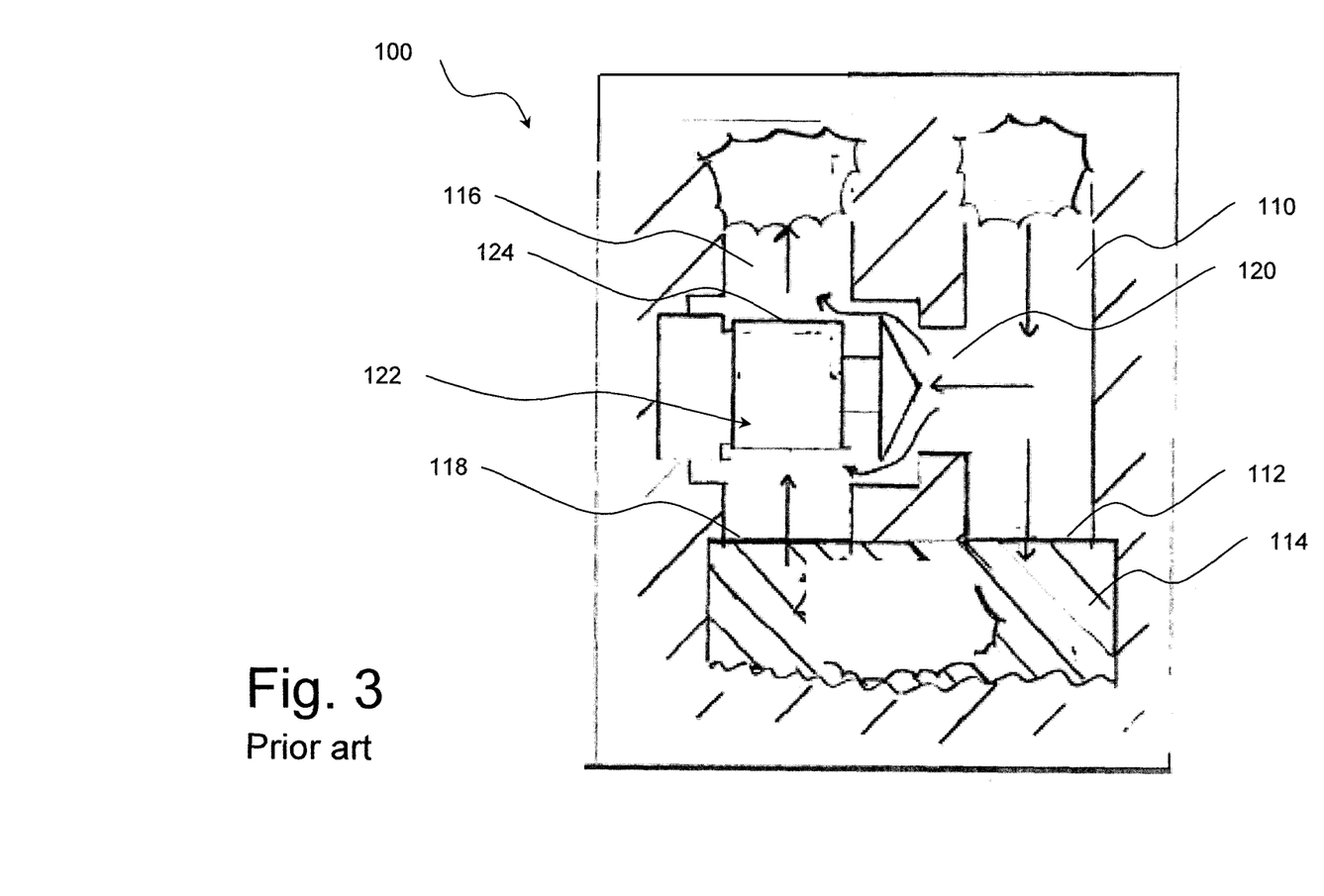
FIG. 3 is a schematic cross-sectional view of a cooling system header in accordance with the prior art.

More particularly, an example cooling system in accordance with the prior art is shown in FIG. 3 which schematizes a cooling system header 100 (or housing) with an fluid supply conduit 110 leading to an inlet 112 of a heat exchanger 114, an fluid return conduit 116 extending from the outlet 118 of the heat exchanger 114, a bypass conduit 120 extending from the fluid supply conduit 110 to the fluid return conduit 116, and a thermal valve 122 having a temperature sensing element 124 located in the fluid return conduit 116, and being thermally operable to open and close the bypass conduit 120 to force less or more liquid through the heat exchanger 114.

The valve 122 basically opens the bypass 116 when the temperature of the fluid is below the threshold temperature, or threshold temperature range, of the valve 122. When the temperature sensed by the temperature sensing element 124 is below the threshold, the valve 122 remains open allowing the liquid to flow primarily through the bypass 120, perhaps trickling across the heat exchanger 114 which offers a greater resistance to flow than the bypass conduit 120. When the temperature of the fluid rises to and above the threshold, the thermal valve 122 is activated to close the bypass 120. Typically, the bypass 120 will then be completely closed off by the valve 122 to pass the entire flow of liquid through the heat exchanger 114.

However, when the temperature of the flow in the fluid supply conduit 110 is at the threshold, or above but close to the threshold, its flow across the bypass conduit 120 can activate the valve 122 via the temperature sensing element 124, eventually forcing more liquid through the heat exchanger 114, and the liquid then exiting the heat exchanger 114 and impinging on the temperature sensing element 124 can be below the threshold temperature, thereby sending a contrary message to the temperature sensing element 124.

At this point, the temperature sensing element 124 can sense a temperature below the threshold which triggers its opening of the bypass conduit 120 although the temperature of the fluid circulating in the fluid supply conduit 110 is still above the temperature threshold range and the valve 122 should remain closed. Immediately after having opened, or even while opening, the valve 122 can sense the hot liquid from the bypass conduit 120, especially as less flow is then directed through the heat exchanger 114, and begin closing again. As will now thus be understood, the valve can actually cycle through or between the open and closed states more than one time, and potentially several times, for each actual temperature cycle of the liquid in the fluid supply conduit 110. This phenomenon can be referred to as valve "chatter", or valve "hunting", and can result in what can be considered premature wear in a context where it was expected that the valve 122 would cycle only once for each temperature cycle, and where the mean time between failures of thermal valves can generally be expressed as a function of a given number of cycles.

As will now be exemplified, the mean time between failure can be increased by reducing unnecessary cycling. Unnecessary cycling can be reduced, or avoided, by controlling the exposure of the temperature sensing element to direct impingement from liquid exiting the heat exchanger outlet during the activation of the valve. This can be achieved by either one, or both, of two strategies presented herein. The first one is to deflect the flow of cooled fluid exiting the heat exchanger to prevent or reduce its direct impingement against with the temperature sensing element. According to this first strategy, the hot flow through the bypass conduit can be directed to the temperature sensing element, for the temperature sensing element to be bathed primarily in the hot flow during the period of time of valve activation. The second strategy is to deflect at least a substantial portion of the flow of hot fluid exiting the bypass conduit for it to mix with the cooled fluid exiting the heat exchanger upstream from the temperature sensing element, exposing the temperature sensing element to a mixed temperature flow rather than potential direct impingement from the cooled fluid.

An implementation example for each of the two strategies will now be fully described.

Figure 1:
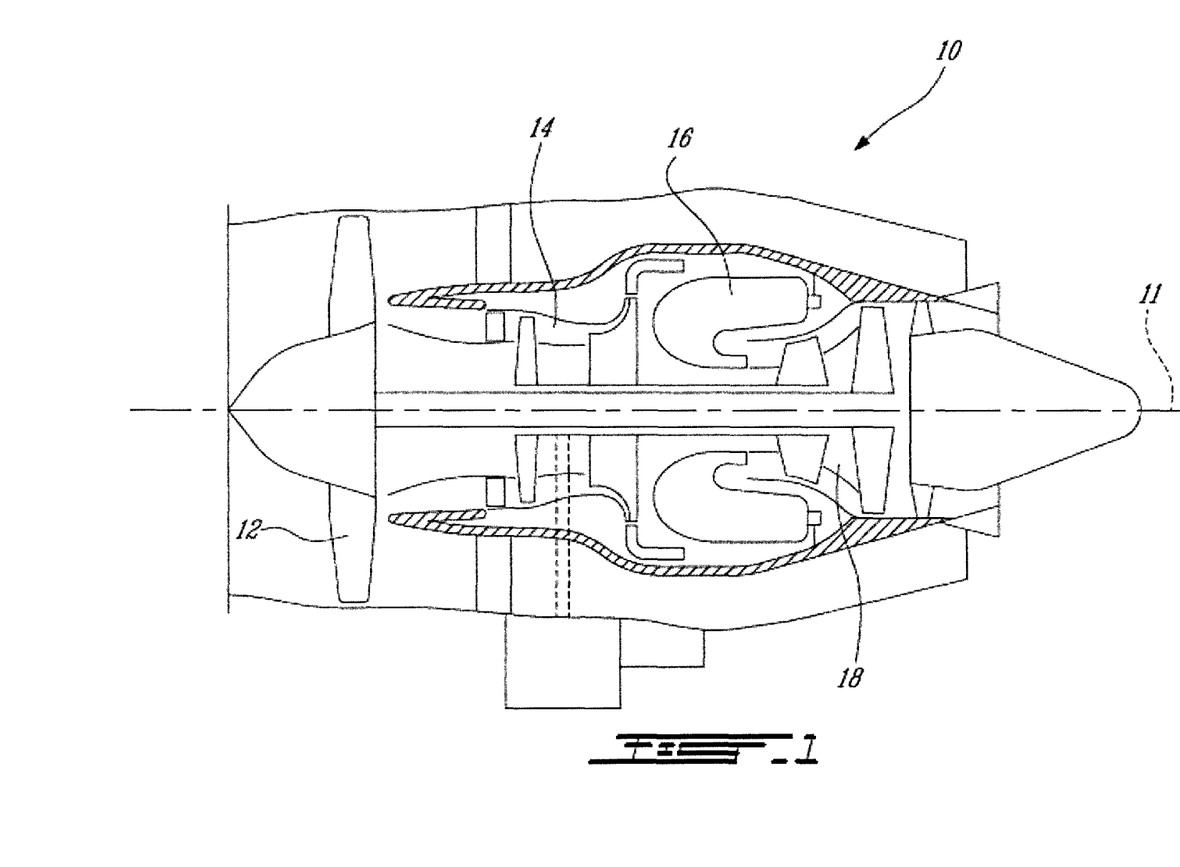
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The fan 12, compressor 14 and turbine section 18 have rotary shafts which are received in the engine casings via bearings. The bearings are continuously supplied in oil by an oil supply system. The bearings are associated with bearing cavities into which the oil is directed by way of a buffer air system and then scavenged to be re-used. During operation, the temperature of the oil thus rises and a cooling system having a heat exchanger located upstream from the bearings is used to ensure that the oil being fed to the bearings remains within given temperature specifications.

Figure 2:
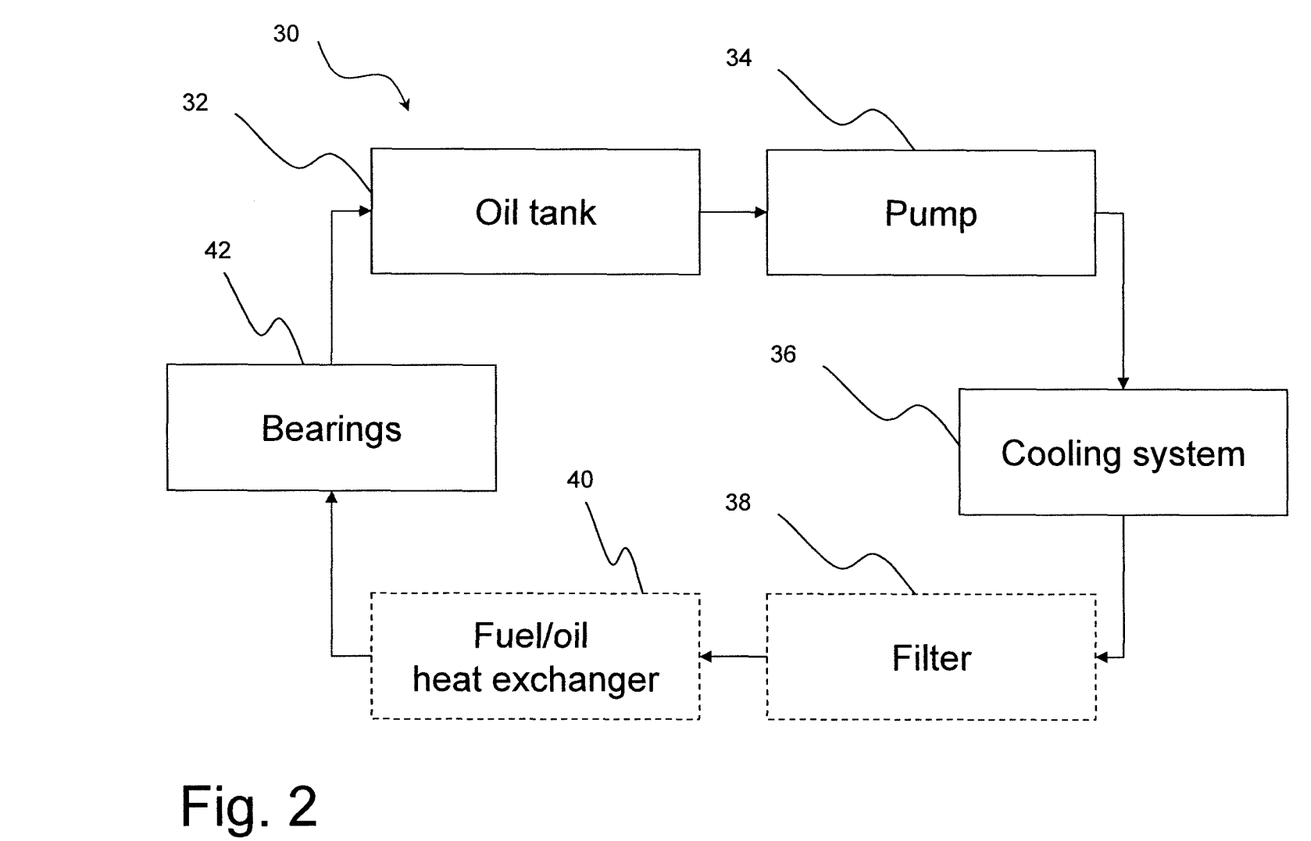
FIG. 2 is a block diagram schematizing a gas turbine engine having a cooling system.

An example bearing oil circuit 30 is shown in FIG. 2 where oil is pumped from an oil tank 32 using an oil pump 34, to a cooling system 36 which, in the case of a typical gas turbine engine, can have an air/liquid heat exchanger having a given cooling capacity. The oil can be filtered 38 before or after its circulation through the cooling system 36, for instance, and one or more secondary cooling system(s) such as a fuel/oil heat exchanger 40 can also be used in some applications. The oil is eventually fed to the bearings 42, scavenged from the bearing cavity(ies) and returned to the oil tank 32.

An example of a cooling system 36 which can be used in a gas turbine application such as described above is schematized in FIG. 4A, where the cooling system includes a housing or header 44 having an inlet port 46 and an outlet port 48 to which associated oil lines can be connected. The inlet port 46 leads to an fluid supply conduit 50 formed in the cooling system header 44 and leading to an inlet 52 of the heat exchanger 54. The heat exchanger 54 can be secured to the cooling system header 44, for instance. The heat exchanger 54 has an outlet 56 in fluid communication with an fluid return conduit 58 extending from the heat exchanger 54 to the outlet port 48, which, in turn, can eventually lead to the bearings. A bypass conduit 60 is provided between the fluid supply conduit 50 and the fluid return conduit 58. The bypass conduit 60 allows the oil in the fluid supply conduit 50 to bypass the heat exchanger 54, and reduce pump power drain, when the liquid is at temperatures below the threshold and cooling is unnecessary. The thermal valve 62, functioning here as a thermally activated bypass valve, is housed in the fluid return conduit 58, and more particularly in a valve chamber 64 which can be provided in the fluid return conduit 58. It will be understood that the shape and configuration of the valve chamber 64 can be adapted to favour, or at least not hinder, exposure of the temperature sensing element 66 to the hot fluid from the bypass conduit 60.

Figure 4A:
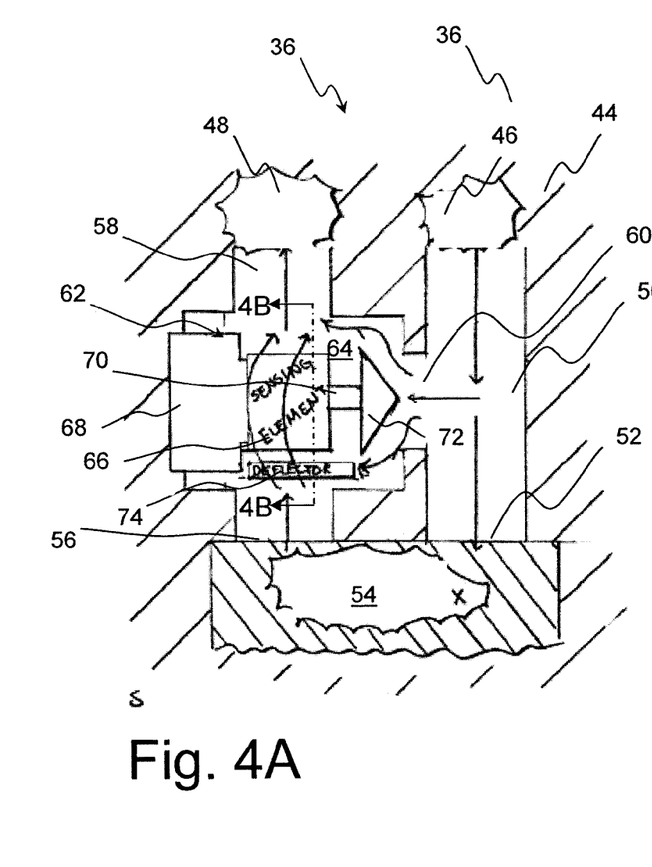
FIG. 4A is a schematic cross-sectional view of a cooling system header with a valve in the open state and incorporating a deflector.

In this particular example the depicted thermal valve 62 is of the wax-based thermostatic type, has a body 68 secured to the fluid return conduit 58 and holding its sensing element 66 fixedly in a position in the fluid return conduit 58. The temperature sensing element 66 encloses a wax which is subjected to significant thermal expansion in the temperature threshold range, which can be of 200-210° F. (93-99° C.), in this particular example. The body 68 also slidingly receives a first end of a rod-like spindle 70, the spindle 70 being mechanically pushed outwardly from the body 68 upon the thermal expansion of the wax, but is spring biased to move back toward the body 68 in the absence of the wax-imparted force. The spindle 70 has a head 72 at the second end, the head 72 being movable against, and back away from, the outlet of the bypass conduit 60 upon the thermal activation, to respectively block or increase the rate of flow through the bypass conduit 60 and, in turn, respectively increase or reduce the flow rate through the heat exchanger 54.

In this particular example, the cooling system header 44 can be provided as a component part which is assembled to the heat exchanger 54. The cooling system header 44 can include a conduit portion which can be directly cast with the conduits formed therein and later closed off by a cover, to name one of many possible constructions.

Figure 4B:
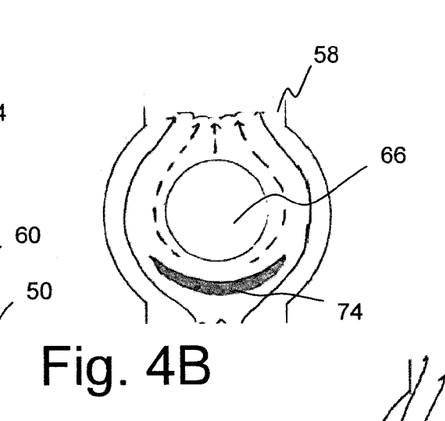
FIG. 4B is a cross-sectional view taken along lines 4B-4B of FIG. 4A.
Figure 4C:
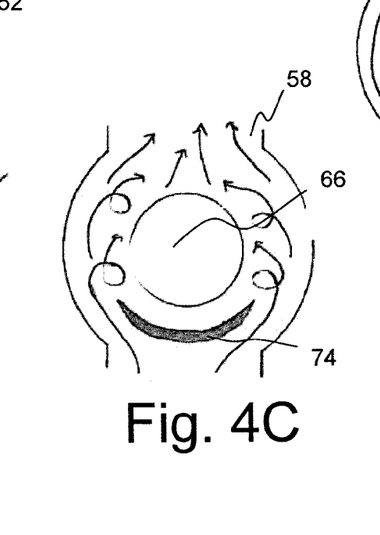
FIG. 4C is a view similar to FIG. 4B schematizing the flow when the valve is in the closed state.

Still referring to the embodiment illustrated in FIGS. 4A, 4B, and 4C, the temperature sensing element 66 is provided in a cylindrical shape. As seen in the figures, and will be understood by persons skilled in fluid mechanics, a deflector 74 is provided here in a lune shape which is adapted to deflect cooled fluid exiting the fluid exchanger 54 around the cylindrical shape of the temperature sensing element 66. The lune shape basically being an extruded crescent shape in this case. A deflector 74 such as this can either be made integral to the conduit 58, or provided as part of the body 68 of the valve 62 itself, for instance.

FIG. 4B, provides a cross-sectional view schematizing the flow when the valve 62 is in the open state. In the open state, the non-cooled fluid progresses through the bypass conduit and gushes into the valve chamber 64, including the space immediately around the temperature sensing element 66 (shown in dotted lines), where a relatively minor flow nonetheless progresses through the heat exchanger 54 and is deflected around the temperature sensing element 66 by the deflector 74.

As the temperature of the bypassing fluid rises such as can occur during operation of the gas turbine engine, the liquid eventually reaches and rises above the temperature threshold range of the thermal valve 62, at which point the valve 62 progresses to the closed state until it eventually completely closes off the bypass conduit 60, forcing the entire flow rate through the heat exchanger 54. A progressively stronger cooled flow thus exits the heat exchanger 54 such as schematized in FIG. 4C. Since the deflector 74 continues to deflect the flow exiting the heat exchanger 54 around the temperature sensing element 66 during and after the closing of the valve 62, the temperature sensing element 66 is exposed less abruptly to the cooled flow from the heat exchanger 56, thereby reducing, and perhaps even preventing, unnecessary cycling of the valve. In other words, the deflector can reduce the system effective feedback gain, i.e. temperature change versus valve displacement, which allows for the valve 62 to converge to a steady state position within the limitation imposed by the inherent temperature return delay, while potentially keeping all the original features of the valve.

Another possible function of the deflector 74 can be to meter the flow from the heat exchanger 54. This can happen if the deflector is configured to not only deflect, but restrict the flow exiting the heat exchanger 54. Metering the flow from the heat exchanger 54 can increase the authority of the valve 62.

Figure 5:
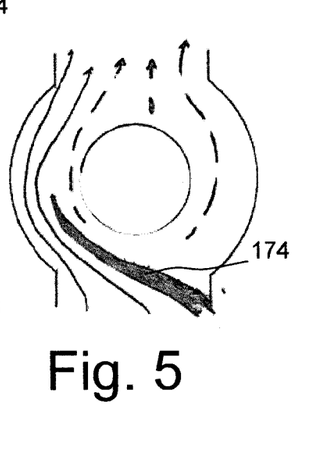
FIG. 5 is a variant of the embodiment shown in FIGS. 4B and 4C.

FIG. 5 shows an alternate embodiment to the one shown in FIGS. 4B and 4C, in which case the deflector 174 has a base affixed to a side of the fluid return conduit, and extends in a sloping manner toward the other side and toward the temperature sensing element. This shape deflects the cooled liquid to one side of the temperature sensing element rather than around both sides, while potentially achieving the same or comparable results. It will be noted that in the embodiments shown in FIGS. 4 and 5, the deflector can be solid, or apertured, depending on the desired fluid mechanics and/or thermodynamic effects.

Figure 6:
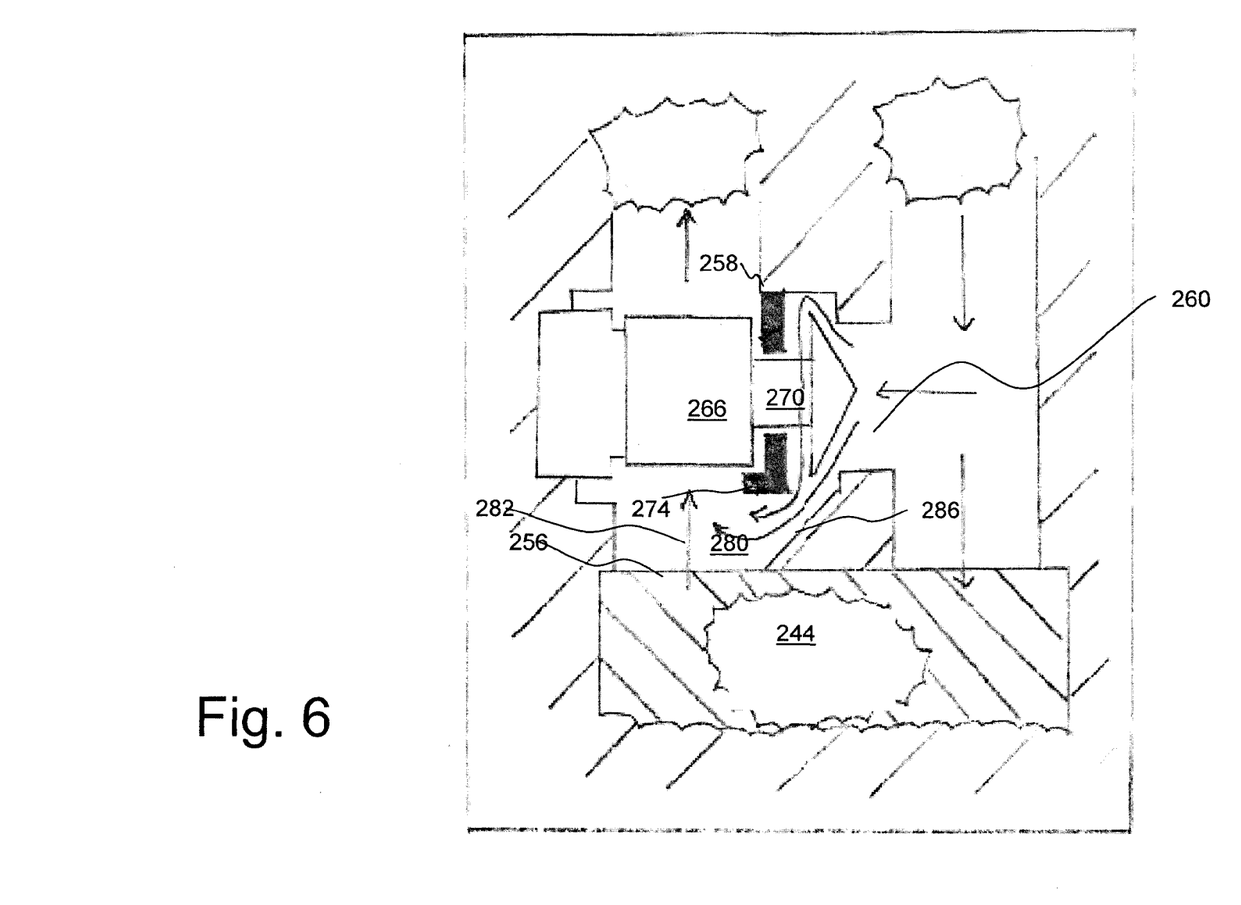
FIG. 6 is a variant to the embodiment shown in FIG. 4A.

FIG. 6 shows an embodiment according to another strategy. A deflector 274 is also used in this case, but rather than deflecting the cooled flow around the temperature sensing element, this deflector 274 deflects the non-cooled flow from the bypass conduit 260 to a location 280 upstream from the temperature sensing element 266, forcing its mixing with the cooled flow 282 exiting the heat exchanger 244. This configuration can also be satisfactory in addressing unnecessary cycling by reducing the exposure of the temperature sensing element 266 to liquid at the cooled temperature during the closing of the valve. It will be noted that in this particular example, the deflector 274 is affixed to the fluid return conduit 258, and more particularly the valve chamber therein, and slidingly receives the valve spindle 270 therethrough, extending around the valve spindle 270 and deflecting most, if not all, of the bypass liquid toward the outlet 256 of the heat exchanger 244. It will also be noted that in this particular example, the cooler header is shaped with a sloping portion 286 which cooperates with the deflector 274 in guiding the bypass liquid to the outlet 256 of the heat exchanger 244, for mixing with the cooled liquid.

The above description is meant to be exemplary only, and one skilled in the art will recognize that changes may be made to the embodiments described without departing from the scope of the invention disclosed. For example, the strategies to address the issue of unnecessary valve cycling such as detailed above can apply to any liquid cooling system which has a thermal valve located downstream the heat exchanger (which is often a design consideration for fail-safe reasons). Example embodiments can include addressing cooling of engine coolant in the automotive industry for instance. Further, the strategies can be used with many types of thermal valves, when the temperature sensing element of the valve is positioned in the conduit receiving the outlet flow of the heat exchanger and a bypass flow. These strategies will likely be particularly useful in systems where the valve is likely to oscillate between the open and closed temperature. A likelihood of oscillation exists when the temperature change capacity of the cooler is above the threshold temperature range of the thermal valve. The likelihood of oscillation rises as the temperature change capacity of the cooler rises, and as the response time of the of the valve lowers relatively to the temperature rise time of the inlet fluid, making the system particularly useful for cooling systems having an important cooling capacity and having a thermal valve with a relatively short response time relative the likely speed of inlet temperature increase. It will also be noted that the example provided above is detailed solely for the purpose of providing a thorough description of a possible embodiment, and that alternate embodiments can have other valve types, as long as the valve can act to control flow of the liquid through the bypass conduit based on fluid temperature sensed by a temperature sensing element positioned in the fluid return conduit. Still other modifications which fall within the scope of the present invention will be apparent to those skilled in the art, in light of a review of this disclosure, and such modifications are intended to fall within the scope of the appended claims.

What is claimed is:

1. An oil system lubricating bearings of a gas turbine engine, the oil system comprising:
   an oil tank;
   an oil pump in fluid flow communication with the oil tank to pump oil from the oil tank to bearings of the gas turbine engine;
   an oil cooling system disposed between the oil pump and the bearings and receiving pressurized oil from the oil pump, the oil cooling system including:
   a heat exchanger having a fluid inlet and outlet;
   a hot fluid supply conduit communicating with the inlet of the heat exchanger;

a cold fluid return conduit communicating with the outlet of the heat exchanger and extending substantially parallel to the hot fluid supply conduit;

a bypass conduit extending transversely between the hot fluid supply conduit and the cold fluid return conduit to form an H-shaped flow configuration;

a thermal valve exposed to one of the hot fluid supply conduit and the cold fluid return conduit and configured for selectively closing the bypass conduit extending therebetween, the thermal valve preventing, when closed, flow through the bypass conduit between the hot fluid supply conduit and the cold fluid return conduit without obstructing flow to and from the heat exchanger via the hot fluid supply conduit and the cold fluid return conduit respectively, the thermal valve having a temperature sensing element positioned downstream of both the heat exchanger and the bypass conduit for sensing the temperature of the fluid, the temperature sensing element configured to selectively move the thermal valve in response to a temperature change of the fluid relative to a temperature threshold of the valve; and a deflector positioned between the temperature sensing element and the heat exchanger outlet, the deflector being stationary and fixed in position to one of the cold fluid return conduit and the bypass conduit, the deflector being shaped and configured to impede direct impingement of cooled liquid flow exiting the heat exchanger outlet via the cold fluid return conduit on the temperature sensing element during activation of the valve.

2. The liquid cooling system of claim 1 wherein the deflector is made integral to the fluid return conduit.

3. The liquid cooling system of claim 1 wherein the deflector is integral to the valve.

4. The liquid cooling system of claim 1 wherein the valve has a body housed inside the fluid return conduit, and a head movable against an outlet of the bypass conduit upon said activation to close off the bypass conduit and force liquid flow through the heat exchanger.

5. The liquid cooling system of claim 4 wherein the valve is biased to move away from the bypass conduit.

6. The liquid cooling system of claim 4 wherein the temperature sensing element is cylindrical and provided as part of the valve body.

7. The liquid cooling system of claim 6 wherein the deflector is lune shaped and oriented transversally to a flow direction of cooled fluid exiting the heat exchanger.

8. The liquid cooling system of claim 1 wherein the deflector extends laterally from one side of the fluid return conduit toward an opposite side, in interference with the temperature sensing element.

9. The liquid cooling system of claim 1 wherein the fluid return conduit, the valve, and the deflector are configured to favour exposure of the temperature sensing element to liquid exiting the bypass conduit during activation of the valve.

10. An oil cooling system of an oil system in a gas turbine engine, the oil system comprising:

a heat exchanger having a fluid inlet and outlet;

a hot fluid supply conduit leading to an inlet of a heat exchanger;

a cold fluid return conduit extending from an outlet of the heat exchanger;

a bypass conduit extending transversely between the fluid supply conduit and the fluid return conduit;

a thermal valve exposed to one of the fluid supply conduit and the fluid return conduit and configured for selectively closing the bypass conduit extending therebetween, the thermal valve preventing, when closed, flow through the bypass conduit between the fluid supply conduit and the fluid return conduit without obstructing flow to and from the heat exchanger via the hot fluid supply conduit and the cold fluid return conduit respectively, the valve having a temperature sensing element positioned downstream of both the heat exchanger and the bypass conduit, the temperature sensing element configured to selectively move the thermal valve in response to a temperature change of the liquid to which the temperature sensing element is exposed, relative to a temperature threshold of the temperature sensing element; and a deflector positioned between the temperature sensing element and at least one of the bypass conduit and the heat exchanger outlet, the deflector being stationary and fixed in position to one of the cold fluid return conduit and the bypass conduit, the deflector being configured and adapted to impede direct impingement of unmixed heat exchanger outlet flow from the cold fluid return conduit on the temperature sensing element during said activation.

11. The liquid cooling system of claim 10 wherein the fluid return conduit leads to bearings of a gas turbine engine.

* * * * *